(12) United States Patent
Schmidl et al.

(10) Patent No.: US 6,597,729 B1
(45) Date of Patent: Jul. 22, 2003

(54) JOINT POSITION AND CARRIER FREQUENCY ESTIMATION METHOD OF INITIAL FREQUENCY ACQUISITION FOR A WCDMA MOBILE TERMINAL

(75) Inventors: Timothy M. Schmidl, Dallas, TX (US); Sundararajan Sriram, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/537,137

(22) Filed: Mar. 29, 2000

(51) Int. Cl.⁷ .............................................. H04L 1/707
(52) U.S. Cl. ...................................... 375/149; 375/150
(58) Field of Search ................................ 375/141, 142, 375/145, 149, 150; 370/320, 335, 342, 441

(56) References Cited

U.S. PATENT DOCUMENTS 5,638,362 A * 6/1997 Dohi et al. ................ 370/342

6,178,197 B1 * 1/2001 Froelich et al. ............. 375/150

OTHER PUBLICATIONS

Boloorian; US patent application Publication No. US2002/0061054 A1: May 23, 2002.*

* cited by examiner

Primary Examiner—Don N. Vo
(74) Attorney, Agent, or Firm—Ronald O. Neerings; Wade James Brady, III; Frederick J. Telecky, Jr.

(57) ABSTRACT

A WCDMA system and method of data communication allows a receiver to reliably achieve carrier frequency acquisition following turn-on without use of temperature compensation. Initial frequency acquisition is achieved by estimating the signal path position having the largest magnitude and then by estimating the phase difference associated with primary synchronization channels at a predetermined position within a single frame. The estimated phase difference is used to estimate a carrier frequency offset that can be used to adjust the local voltage controlled oscillator frequency, thereby acquiring the WCDMA communication signal carrier frequency.

31 Claims, 3 Drawing Sheets

JOINT POSITION AND CARRIER FREQUENCY ESTIMATION METHOD OF INITIAL FREQUENCY ACQUISITION FOR A WCDMA MOBILE TERMINAL

BACKGROUND OF THE INVENTION

1. Field of the Invention

This invention relates generally to wideband code division multiple access (WCDMA) for a communication system and more particularly to a method of initial frequency acquisition following turn-on for a mobile terminal in a WCDMA system.

2. Description of the Prior Art

Wireless networks are becoming increasingly popular, and in this regard there have been improvements in many aspects of such networks. Some improvements relate to carrier frequency acquisition techniques. F. Classen and H. Meyr, *Maximum Likelihood Open Loop Carrier Synchronizer For Digital Radio*, IEEE International Conference on Communications (ICC), vol. 1, pp. 493–497 (1993), for example, discloses one method of frequency acquisition implemented for small carrier frequency offsets in which phase differences between consecutive symbols are computed. Classen et al. show that a small carrier frequency offset can be estimated by:

$$2\pi \Delta \hat{f} P = angle\left( \sum_n \frac{a_{n+1}^*}{a_n^*} z_n^* z_{n+1} \right);$$

$Z_n$ denotes received symbols, $a_n$ denotes the data modulating these symbols, P denotes the symbol period and $\Delta \hat{f}$ an estimate of the carrier frequency offset.

The initial carrier frequency offset seen by a mobile terminal following power-on, can however, be as much as 10 ppm, which is 20 kHz at a carrier frequency of 2 GHz. This large carrier frequency offset is unavoidable where inexpensive oscillators without temperature compensation must be used in order to compete in the wireless network market place. Oscillators having better frequency stability require temperature compensation capability and are prohibitively expensive. In view of the foregoing, there will be as much as a 10 ppm error in the sampling clock at a mobile terminal where the carrier frequency clock and the sampling rate clock are locked together in order to correct the sampling rate offset. A sampling rate of 3.84 MHz will thus see an error as large as 38.4 chips per second. Therefore, the sampling rate will automatically be corrected when the carrier frequency offset is corrected.

The foregoing large errors in the carrier frequency and sampling rate make initial frequency acquisition difficult. The Primary synchronization channel (SCH) associated with WCDMA communication has symbols that are 256 chips (66.7 µsec) long. Further, a carrier frequency offset of 20 kHz for a 2 GHz carrier frequency causes a phase rotation of 480 degrees from the beginning to the end of the PSC symbol. A coherent summing of all 256 chips should not therefore be performed with such a large carrier frequency offset. A sampling rate offset of 38.4 chips per second, for example, causes the sampling position to change by 0.384 chips in 10 msec. Thus, some form of drift compensation would have to be employed to track the correct sampling position if the same sampling position is used for more than 10 msec.

In view of the foregoing, a cost competitive and efficient technique for achieving initial frequency acquisition following power-on for a mobile terminal associated with WCDMA communications is both desirable and necessary to advance the art related to wireless networks.

SUMMARY OF THE INVENTION

The present invention is directed to a method of determining a carrier frequency offset immediately following power-up of a mobile terminal during WCDMA mode communication between a base station and the mobile terminal such that the initial carrier frequency can be acquired by the mobile terminal prior to initiating communication. Since the Primary SCH cannot be summed coherently over its full length with a frequency offset as high 20 kHz, it is first divided into parts, i.e. 4 parts, to provide a desired pull-in range for a frequency estimator according to one embodiment of the present invention. In this embodiment, let the correlation outputs with each of the 4 parts of the Primary SCH (each with 64 chips) at position k and time slot m be represented by $S_{1,k,m}$, $S_{2,k,m}$, $S_{3,k,m}$, and $S_{4,k,m}$. The phase difference $\Delta \phi$ between each segment can then be calculated and used to estimate the carrier frequency offset.

$$\Delta \hat{f} = \Delta \hat{\phi} \frac{1}{2\pi T} \qquad (1)$$

The symbol T denotes the length of a single segment and 1/(2T) is assumed to be 30,000 for one embodiment described herein. The estimate of the phase difference calculated from the Primary SCH's at position k in one frame is:

$$\Delta \hat{\phi} = angle\left( \sum_{m=1}^{L} s_{1,k,m}^* s_{2,k,m} + s_{2,k,m}^* s_{3,k,m} + \ldots + s_{y-1,k,m}^* s_{y,k,m} \right) \qquad (2)$$

where L is the number of time slots and y is the number of segments. The position p of the path with the largest magnitude is first estimated by finding $$p = \arg\max_k \left( \left| \sum_{m=1}^{L} s_{1,k,m}^* s_{2,k,m} + s_{2,k,m}^* s_{3,k,m} + \ldots + s_{y-1,k,m}^* s_{y,k,m} \right|^2 \right) \qquad (3)$$

The position p of the path with the largest magnitude determined from equation (3) is then used to estimate the phase difference given by equation (2). This phase difference determined by equation (2) is then used in equation (1) to estimate the carrier frequency offset. Finally, the acquisition time is determined by the probability that the path at position p really exists and by the standard deviation of the frequency estimate when the path does exist.

Initial frequency acquisition can also be achieved using a frequency bin method by first correcting the carrier frequency offset to within 2 ppm. This technique is useful where absolutely no additional increase in hardware can be tolerated. The frequency range of interest is first divided into a number of bins, preferably 5 bins, e.g. −16,−8, 0, 8 and 16 kHz, which corresponds to −8, −4, 0, 4 and 8 ppm respectively for a frequency range between −20 kHz and +20 kHz. Frequency acquisition is performed by first assuming the carrier frequency offset is 0 Hz and performing the steady state acquisition. If the carrier frequency offset is outside the range of −4 to 4 kHz, then the acquisition will likely fail, and another bin will be tried. The mobile terminal preferably stores carrier frequency offset information from just before it was previously powered-off. During power-on, the mobile terminal can then start the search in the bin corresponding to the one stored in memory.

Accordingly, a WCDMA communication signal is first downconverted and sampled at the receiver or mobile terminal. Frequency acquisition is then implemented in 3 stages. In stage 1 of acquisition, the primary synchronization code is first located. During stage 2 of acquisition, the secondary synchronization code that overlaps the primary synchronization channel containing the primary synchronization channel symbols is decoded. This secondary synchronization code indicates the code group used by the cell. In stage 3 of acquisition, the particular scrambling code used by the base station of interest is determined by searching through the scrambling codes in the code group. If the correct scrambling code has been determined, the receiver can enter its steady state operating mode wherein communication between the base station and the mobile terminal takes place. If communication between the base station and the mobile terminal cannot be achieved within a predetermined period of time, another bin is chosen and the foregoing process repeated. This process will then continue until the local VCO frequency is correctly adjusted to account for the carrier frequency offset thereby allowing the mobile terminal/receiver to enter its steady state operating mode.

As used herein, the following words have the following meanings. The words "algorithmic software" means an algorithmic program used to direct the processing of data by a computer or data processing device. The words "data processing device" as used herein refer to a CPU, DSP, microprocessor, micro-controller, or other like device and an interface system. The interface system provides access to the data processing device such that data could be entered and processed by the data processing device. The words "discrete data" as used herein are interchangeable with "digitized data" and "digitized data" as used herein means data which are stored in the form of singularly isolated, discontinuous data or digits.

In one aspect of the present invention, a method of achieving initial frequency acquisition for a mobile terminal in a WCDMA system accommodates frequency offsets up to about 10 ppm.

In another aspect of the present invention, a method of achieving initial frequency acquisition for a mobile terminal in a WCDMA system accommodates frequency offsets up to about 10 ppm with no additional hardware requirements.

In still another aspect of the present invention, a method of achieving initial frequency acquisition for a mobile terminal in a WCDMA system accommodates frequency offsets up to about 10 ppm with substantially no user noticeable operational characteristics.

In yet another aspect of the present invention, a method of achieving initial frequency acquisition for a mobile terminal in a WCDMA system without requiring use of a temperature compensated oscillator at the mobile terminal.

Still another aspect of the present invention is associated with achieving initial frequency acquisition for a mobile terminal in a WCDMA system that is easy to accomplish and cost competitive in the wireless network product marketplace, even when the carrier frequency offset between a base station and the mobile terminal is as large as about 10 ppm.

Yet another aspect of the present invention is associated with achieving initial frequency acquisition for a mobile terminal in a WCDMA communication system without use of multiple metrics such that memory usage efficiency is optimized.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
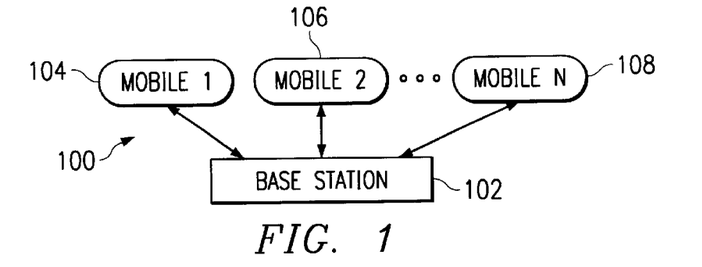
FIG. 1 is a block diagram of a typical cell within a wideband code division multiple access (WCDMA) system showing a single base station in communication with a plurality of mobile terminals.

FIG. 1 is a block diagram of a typical cell 100 within a wideband code division multiple access (WCDMA) system showing a single base station 102 in communication with a plurality of mobile terminals 104, 106, 108. Following power-on for any particular mobile terminal 104–108, the carrier frequency offset between the mobile terminal 104–108 and the base station 102 can be as much as 10 ppm, which is 20 kHz at a carrier frequency of 2 GHz, when the mobile terminal 104–108 does not incorporate a temperature compensated oscillator. Since use of temperature compensated oscillators is cost prohibitive for the present wireless communication products market, it is desirable to provide a technique for achieving initial carrier frequency acquisition at a mobile terminal 104–108 without use of such temperature compensated oscillators or otherwise necessitating additional hardware requirements. The clocks for the carrier frequency and the sampling rate are locked together at each mobile terminal 104–108, therefore also creating as much as a 10 ppm error in the mobile terminal sampling clock (not shown). A sampling rate error of 38.4 chips per second will result when the sampling rate is 3.84 MHz, for example, when the oscillator error is 10 ppm. Thus, when the carrier frequency offset is corrected, the sampling rate will also automatically be corrected.

Figure 2:
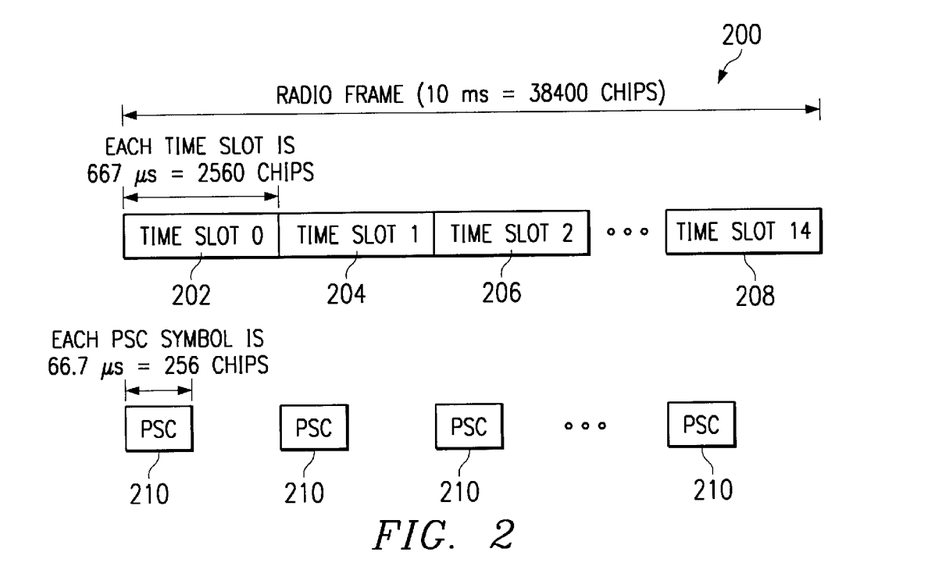
FIG. 2 is a diagram of a typical FDD/WCDMA radio frame that may be transmitted by the communication system of FIG. 1.

FIG. 2 is a diagram of a FDD/WCDMA radio frame 200 that may be transmitted by the communication system of FIG. 1. The radio frame 200 can be seen to have a duration of 10 msec. The radio frame is divided into 15 equal time slots 202–208. Each of these time slots 202–208 is further divided into 2560 chip times Tc. A Primary synchronization channel (SCH) symbol 210 consisting of a modulated code of length 256 chips (66.7 μsec), is transmitted once every time slot 202–208 and is generally the same for all cells in a communication system.

Figure 3:
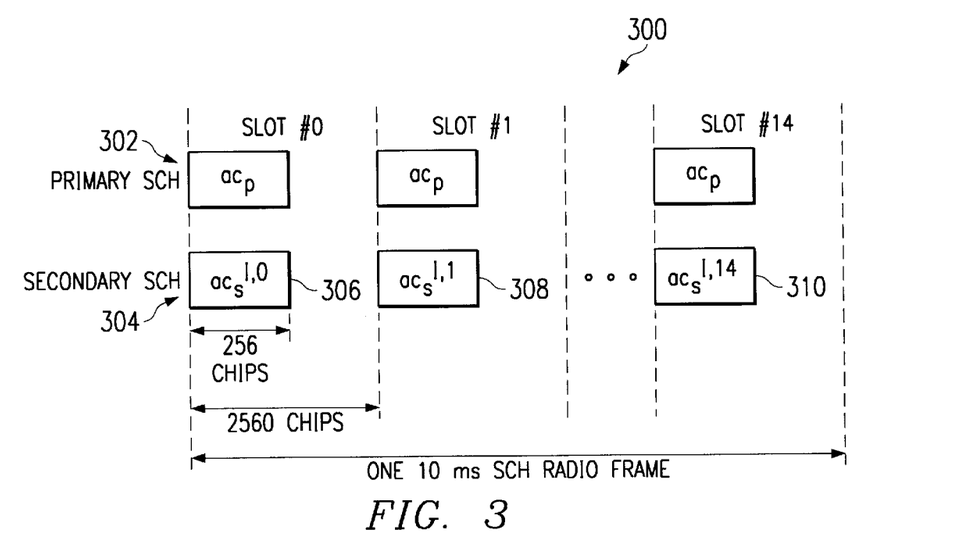
FIG. 3 illustrates the structure of a typical synchronization channel (SCH) including a Primary and Secondary (SCH) associated with the WCDMA radio frame shown in FIG. 2.

FIG. 3 illustrates the structure of a typical synchronization channel (SCH) 300 including a Primary (SCH) 302 and Secondary (SCH) 304 associated with the WCDMA radio frame 200 shown in FIG. 2. The Primary SCH 302, as stated above, consists of a modulated code of length 256 chips, that is transmitted once every time slot 202–208 and is denoted $c_p$ in FIG. 3. The Secondary SCH 304 consists of repeatedly transmitting a length 15 symbol sequence 306–310 of modulated codes of length 256 chips, transmitted in parallel with the Primary SCH 302 symbol 210 codes. The Secondary SCH 304 symbol sequence 306–310 is denoted $c_s^{i,k}$ in FIG. 3, where i=1,2, . . . ,64 is the number of the scrambling code group, and k=0,1, . . . ,14 is the slot number. Each Secondary SCH 304 symbol sequence 306–310 is chosen from a set of 15 different codes of length 256. This sequence 306–310 on the Secondary SCH 304 indicates which of the code groups the cell's downlink scrambling code belongs to.

Figure 4:
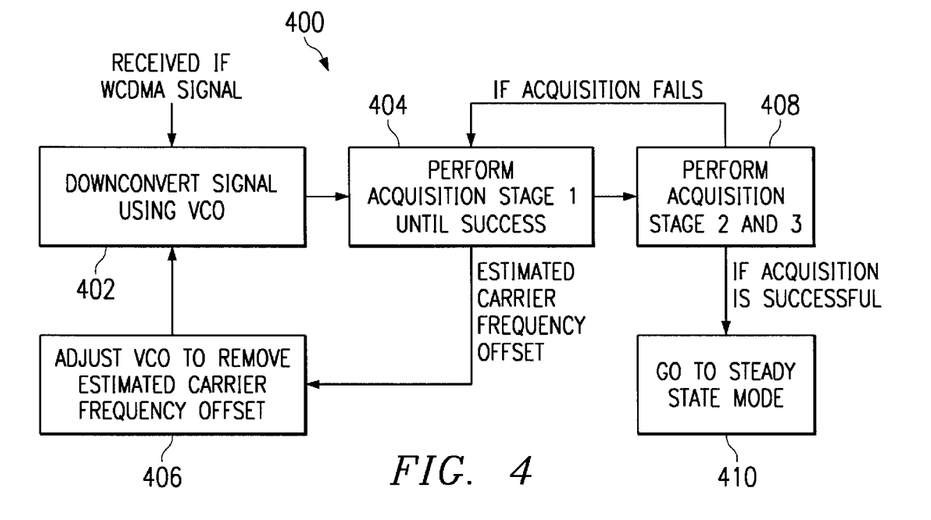
FIG. 4 is a block diagram illustrating one method of achieving initial frequency acquisition for a mobile terminal in a WCDMA communication system such as shown in FIG. 1 according to one embodiment of the present invention.

FIG. 4 is a block diagram 400 illustrating one method of achieving initial frequency acquisition for a mobile terminal in a WCDMA communication system such as shown in FIG. 1 according to one embodiment of the present invention. Since the Primary SCH 302 cannot be summed coherently over its full length with a frequency offset as high as 20 kHz, it can still be subdivided into parts, e.g. 2 or 4 parts, such that the base station/transmitter carrier frequency can be acquired by a mobile terminal/receiver following its initial power-up. If a Primary SCH 302 has symbols that are 256 chips (66.7 μsec) long, it can be divided into 2 parts, for example, such that the pull-in range of the frequency estimator will be +/−15 kHz. Using the 10 ppm initial carrier frequency offset described herein above, this is less than the required pull-in range of 20 kHz. Therefore, the Primary SCH 302 is more preferably divided into 4 parts such that the pull-in range is now +/−30 kHz, which is enough to acquire a carrier frequency having the above described 20 kHz carrier frequency offset.

Using the WCDMA time slots 306–310 depicted in FIG. 3, it is quickly realized that there are 5120 positions in the search window with half-chip resolution and 2560 chips per time slot. Storing 16 bits per position will therefore require 10240 bytes of memory. Since it is desired to minimize memory requirements associated with the present invention, multiple metrics per position necessarily must therefore be avoided. This requirement is accommodated by the present invention wherein a joint position and carrier frequency estimation metric is analyzed to achieve initial frequency acquisition according to one embodiment of the present invention as described in further detail herein below.

The instant embodiment is clearly described first by letting the correlation outputs associated with each of the 4 parts (segments) of the Primary SCH 302 (each with 64 chips) at position k and time slot m be represented by $S_{1,k,m}$, $S_{2,k,m}$, $S_{3,k,m}$, and $S_{4,k,m}$. The phase difference $\Delta\phi$ between each segment can then be determined according to the present method and used to estimate the carrier frequency offset.

$$\Delta \hat{f} = \Delta \hat{\phi} \frac{1}{2\pi T} \tag{1}$$

The estimate of the phase difference calculated from the Primary SCH's at position k in one frame is:

$$\Delta \hat{\phi} = angle\left(\sum_{m=1}^{L} s_{1,k,m}^* s_{2,k,m} + s_{2,k,m}^* s_{3,k,m} + \ldots + s_{y-1,k,m}^* s_{y,k,m}\right) \tag{2}$$

where L denotes the number of time slots, m denotes the specific time slot, y is the number of segments, and k is the position within the specific time slot. The position p of the path with the largest magnitude is first estimated by finding $$p = \arg\max_{k}\left(\left|\sum_{m=1}^{L} s_{1,k,m}^* s_{2,k,m} + s_{2,k,m}^* s_{3,k,m} + \ldots + s_{y-1,k,m}^* s_{y,k,m}\right|^2\right) \tag{3}$$

This position p estimated by equation (3) to have the largest magnitude will then provide the necessary and correct path data such that the phase difference $\Delta\phi$ between segments referenced above can be determined by using that path data in equation (2). The actual acquisition time according to one embodiment of the present invention, will be determined by the probability that the path associated with the position p having the largest magnitude really does exist and further by the standard deviation of the frequency estimate when the path does in fact exist. These parameters are used to formulate a joint metric that can be used to accept or reject the carrier frequency offset determined by equation (1) above. When the joint metric falls within a predetermined window, the estimated carrier frequency offset is then used to acquire the respective carrier frequency and therefore correct any residual carrier frequency error offset within the mobile terminal.

With continued reference to FIG. 4, the foregoing principles of the present method are now described in further detail herein below. According to one embodiment, the present method begins following initial power-up of a mobile terminal. Following power-up, the mobile terminal or receiver first downconverts a WCDMA signal received from the base station or transmitter. This downconversion is depicted in block 402. Following the downconversion, the mobile terminal/receiver begins to acquire the base station/transmitter carrier signal by entering stage 1 of the present method as shown in block 404. During stage 1 of acquisition, the location of the primary synchronization code and the carrier frequency associated with the base station/transmitter are estimated by the mobile terminal/receiver using the principles set forth above with reference to equations (1)–(3). Subsequent to estimating the carrier frequency offset during stage 1 of the acquisition process, the carrier frequency at the mobile/receiver is then corrected by adjusting the local VCO to remove the estimated carrier frequency offset such as illustrated at block 406. With the VCO now adjusted to the estimated carrier frequency, the mobile/receiver next enters stages 2 and 3 of the present method as shown in block 408. In stage 2, the secondary synchronization code that overlaps the Primary SCH containing the primary synchronization symbols 210 is decoded so that the mobile/receiver will know which group of downlink codes the base station/transmitter uses. In stage 3, the scrambling code being used by the particular base station/transmitter is then determined from the foregoing group of downlink codes by correlating the downlink codes with the pilot symbols transmitted by the base station/transmitter. If the correlation fails, the present frequency acquisition cannot take place and the present process must repeat stages 1–3 of initial frequency acquisition until the carrier frequency is successfully acquired. Upon successful frequency acquisition, the mobile/receiver then begins communication with the base station/transmitter by entering into its steady state operating mode as depicted in block 410.

Figure 5:
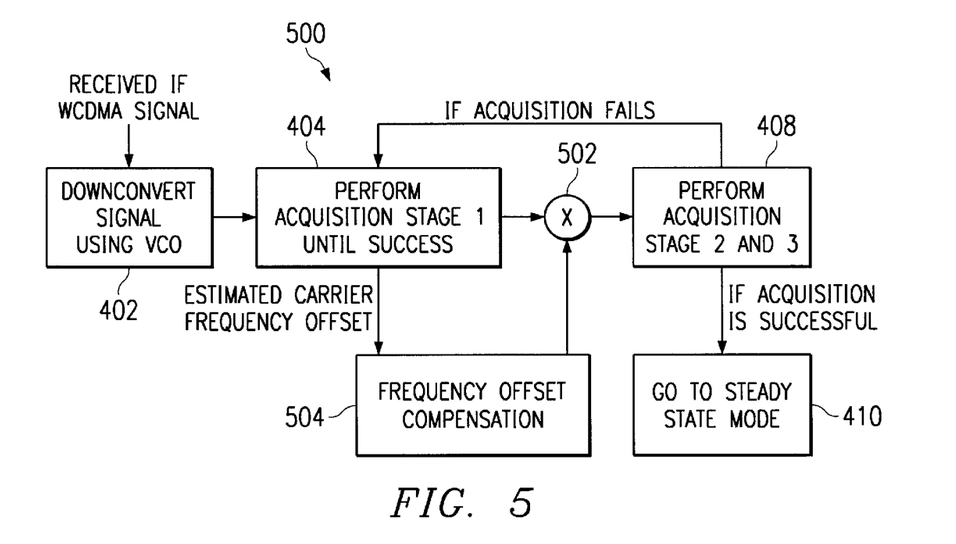
FIG. 5 is a block diagram illustrating another embodiment of the present method of achieving initial frequency acquisition for a mobile terminal in a WCDMA communication system such as shown in FIG. 1.

FIG. 5 is a block diagram 500 illustrating another embodiment of the present method of achieving initial frequency acquisition for a mobile terminal in a WCDMA communication system such as shown in FIG. 1. The present method according to FIG. 5 is very similar to the method described above with reference to FIG. 4. The instant method however, implements carrier frequency adjustment at the mobile/receiver using a completely different technique. The VCO is left unattended, and instead, frequency offset compensation is implemented by multiplying the sampled information by complex frequency correction factors as illustrated in blocks 502 and 504. Such multiplication of samples by complex frequency correction factors is a technique well known to those skilled in the art of signal processing and so further details of this portion of the present method will not be discussed herein to preserve clarity and brevity.

Figure 6:
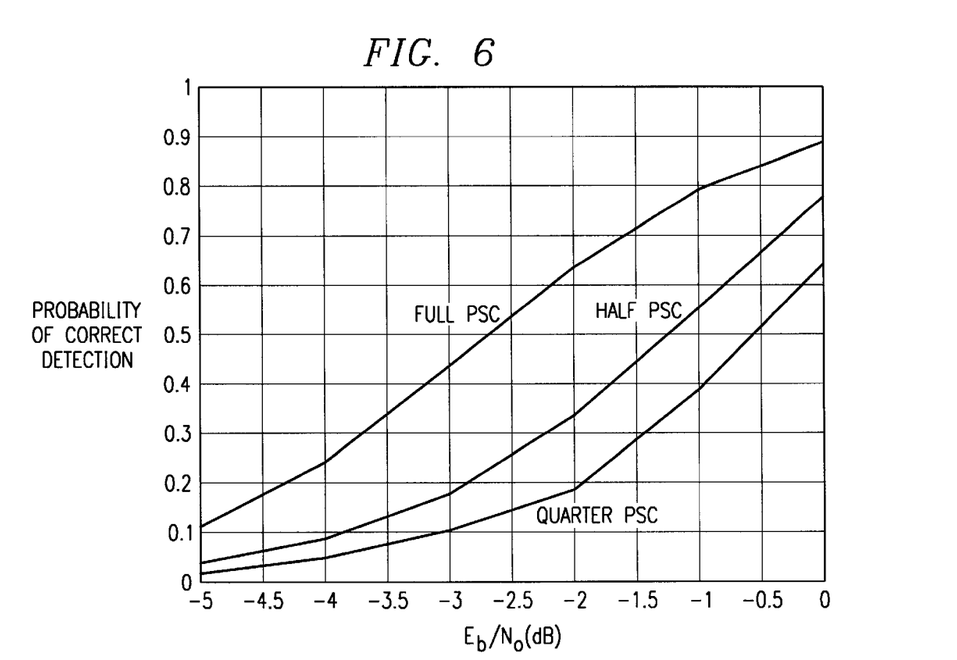
FIG. 6 is a graph illustrating simulated results for the probability of correct detection of a single path in AWGN with no carrier frequency offset and with averaging over 16 time slots for $E_b/E_o$ values ranging from −5 to 0 dB according to one embodiment of the present invention.

FIG. 6 is a graph of simulated results illustrating the probability of correct detection of a single path in additive white Gaussian noise (AWGN) with no carrier frequency offset and with averaging over 15 time slots for $E_b/E_o$ values ranging from −5 to 0 dB when using the present method. All of the samples of the Primary SCH 302 are used in every case, and the coherent sum is taken over 256, 128 and 64 chips, respectively, for the full Primary SCH, half Primary SCH and quarter Primary SCH. In the instant simulation, the carrier frequency offset was set at 0 so that coherent averaging over the full Primary SCH could be performed. The simulation was performed with averaging over 16 time slots (10 msec). It is seen that the probability of acquisition with the quarter Primary SCH is about a factor of 4 smaller than that obtained with the full Primary SCH at an $E_b/E_o$ of −3 dB. This means that initial acquisition will take about 4 times as long as steady state acquisition using the full Primary SCH (with a small carrier frequency offset).

Application of the present method via an exemplary mobile terminal demonstrates the complexity of software and hardware modifications necessary to accommodate initial frequency acquisition for a mobile terminal in a WCDMA communication system. Stage 1 (finding the location of the primary synchronization code) of the foregoing steady state acquisition, for example, will require 13 complex adds for the correlation with the Primary SCH and 2 real adds to accumulate the power at each position. The total number of real adds required is (28)(7.68e6)=215 million real adds per second. In contrast thereto, the joint position and frequency estimation metric of the present method requires 20 complex adds for the correlation with the Primary SCH and then 3 complex multiplies and 3 complex adds to sum up the phasors computed at each position. If the complex multiplies for the exemplary mobile terminal are done in hardware (i.e., not on the DSP), extra hardware must be added to the mobile terminal or remote receiver. If each complex multiply is equivalent to 8 complex adds, then the computational complexity for Stage 1 of initial acquisition is (94)(7.68e6)=722 million real adds per second, which is an increase of over a factor of 3 in computational complexity over the steady state acquisition technique (using the full Primary SCH) for the exemplary mobile terminal.

Table 1 below presents the standard deviation of the carrier frequency offset estimate for different amounts of averaging. At an $E_b/N_o$ of −3 dB and with quarter symbol coherent averaging over 15 time slots, the standard deviation of the carrier frequency offset is 6600 Hz (3.32 ppm) with the AWGN channel. Therefore, if stages 2 and 3 of acquisition require a frequency accuracy of 2 ppm, then about 50% of the time the frequency will be outside this range, and the acquisition time will double to about 8 times the steady state acquisition time. Stage 2 of the present initial frequency acquisition technique requires decoding the secondary synchronization code that overlaps the Primary SCH 302 that contains the primary synchronization symbols 210. After decoding the secondary synchronization symbols, the mobile terminal will know which group of downlink codes the base station uses. Stage 3 of the present initial frequency acquisition method is associated with determination of the particular scrambling code from the group determined in stage 2, that is being used by the particular base station and can be implemented by correlation with the pilot symbols.

TABLE 1

Standard deviation of carrier frequency offset estimates obtained from the primary synchronization channel (PSC) with AWGN channel.

|  | −3 dB $E_b/N_o$ | −1 dB $E_b/N_o$ | 1 dB $E_b/N_o$ | 3 dB $E_b/N_o$ | 5 dB $E_b/N_o$ |
|---|---|---|---|---|---|
| Quarter symbol | 0.89 rad | 0.57 rad | 0.31 rad | 0.20 rad | 0.14 rad |
| pull-in range = 30000 Hz | 4.56 ppm | 2.92 ppm | 1.57 ppm | 1.03 ppm | 0.70 ppm |
| 8 time slots = 5.3 ms | 9200 Hz | 5800 Hz | 3100 Hz | 2100 Hz | 1400 Hz |
| Half symbol | 0.82 rad | 0.61 rad | 0.38 rad | 0.29 rad | 0.21 rad |
| pull-in range = 15000 Hz | 2.08 ppm | 1.54 ppm | 0.96 ppm | 0.74 ppm | 0.54 ppm |
| 8 times lots = 5.3 ms | 4200 Hz | 3100 Hz | 1900 Hz | 1500 Hz | 1100 Hz |
| Quarter symbol | 0.65 rad | 0.34 rad | 0.22 rad | 0.14 rad | 0.09 rad |
| pull-in range = 30000 Hz | 3.32 ppm | 1.72 ppm | 1.10 ppm | 0.71 ppm | 0.47 ppm |
| 15 time slots = 10 ms | 6600 Hz | 3400 Hz | 2200 Hz | 1400 Hz | 930 Hz |
| Half symbol | 0.63 rad | 0.41 rad | 0.28 rad | 0.19 rad | 0.15 rad |
| Pull-in range = 15000 Hz | 1.60 ppm | 1.03 ppm | 0.71 ppm | 0.49 ppm | 0.38 ppm |
| 15 time slots = 10 ms | 3200 Hz | 2100 Hz | 1400 Hz | 980 Hz | 760 Hz |
| Quarter symbol | 0.24 rad | 0.15 rad | 0.10 rad | 0.07 rad | 0.05 rad |
| pull-in range = 30000 Hz | 1.22 ppm | 0.75 ppm | 0.50 ppm | 0.35 ppm | 0.23 ppm |
| 60 times lots = 40 ms | 2400 Hz | 1500 Hz | 1000 Hz | 690 Hz | 460 Hz |

TABLE 1-continued

Standard deviation of carrier frequency offset estimates obtained from the primary synchronization channel (PSC) with AWGN channel.

| | −3 dB $E_b/N_o$ | −1 dB $E_b/N_o$ | 1 dB $E_b/N_o$ | 3 dB $E_b/N_o$ | 5 dB $E_b/N_o$ |
|---|---|---|---|---|---|
| Half symbol | 0.26 rad | 0.18 rad | 0.13 rad | 0.10 rad | 0.08 rad |
| pull-in range = 15000 Hz | 0.67 ppm | 0.46 ppm | 0.34 ppm | 0.25 ppm | 0.19 ppm |
| 60 time slots = 40 ms | 1300 Hz | 920 Hz | 670 Hz | 500 Hz | 390 Hz |

In summary explanation of the above, the present method of initial frequency acquisition first implements both position and carrier frequency estimation techniques during stage 1 to find the location of the primary synchronization code that is associated with the position p of the path with the largest magnitude. Upon locating the primary synchronization code, the estimated carrier frequency offset is next corrected by either adjusting the voltage controlled oscillator (VCO) or multiplying the samples acquired at the mobile terminal by complex frequency correction factors. Stages 2 and 3 of the present initial frequency acquisition method are next performed wherein 1) the secondary synchronization code that overlaps the Primary SCH that contains the Primary SCH symbols is decoded so that the mobile terminal will know which group of downlink codes the base station uses and 2) the particular scrambling code used by the base station is determined by correlation between a single scrambling code and the distinct pilot symbols contained within the received WCDMA communication signal transmitted by the base station. As used herein, correlation means finding the scrambling code having highest energy level subsequent to decoding the pilot symbols via the scrambling code. Since the present method will likely not achieve initial frequency acquisition if either the position or carrier frequency information estimated during stage 1 is erroneous, this process is then repeated until initial frequency acquisition actually transpires. Finally, the mobile terminal will enter its steady state operating mode when it has successfully achieved the initial frequency acquisition following power-up. The present method is preferably used following initial power-up of a mobile terminal or can optionally be implemented following predetermined lengthy periods of sleep mode.

Figure 7:
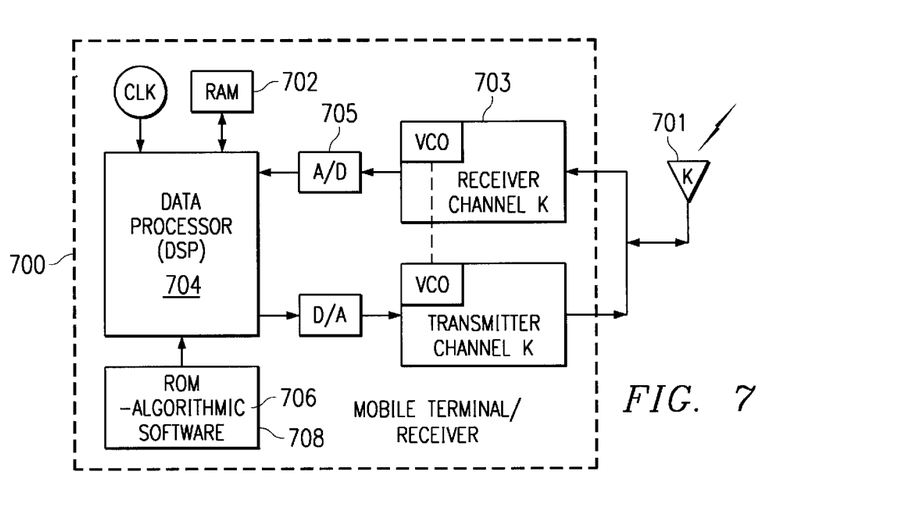
FIG. 7 is a simplified block diagram illustrating a mobile terminal/receiver configured to implement initial frequency acquisition according to one embodiment of the present invention.

FIG. 7 illustrates a mobile terminal/receiver 700 suitable for implementing the present method according to one embodiment of the present invention. The WCDMA signal is received via antenna 701 and thereafter is sampled via receiver 703 and its associated A/D 705. The sampled signal data is stored in a data storage device such as a RAM 702 where it can be accessed by a data processor 704 such as a DSP. The data processor 704 is directed by an algorithmic software 706, preferably stored within a non-volatile data storage device such as a ROM 708. The algorithmic software 706 directs the operation of the data processor 704 using algorithmically defined relationships associated with the WCDMA communication signal and described herein above, such that the carrier frequency of the base station/transmitter generating the WCDMA communication signal can be acquired by the mobile terminal/receiver 700 following turn-on of the mobile terminal/receiver 700.

This invention has been described in considerable detail in order to provide those skilled in the wireless communication art with the information need to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. Although the present invention has been described in association with a particular set of symbol characteristics and a particular carrier frequency offset condition, for example, the present invention can accommodate initial frequency acquisition associated with many other symbol characteristics and related carrier frequency offset conditions. Those skilled in the art of wireless communication will appreciate that the principles of the invention described and claimed herein also apply to WCDMA time division duplex (TDD) signal communication; although the various embodiments described herein are exemplified using WCDMA frequency division duplex (FDD) signal characteristics. The present invention also applies to communication systems other than WCDMA communications wherever those other communication systems employ pilot symbols and the like. Further, the exemplary frequency acquisition methods of the present invention can be implemented in hardware or software, or a combination of both. In a preferred embodiment, the functions of a data communication system designed in conformance with the principals set forth herein are implemented as one or more integrated circuits using a suitable processing technology, e.g., CMOS, HBT.

As another example, at least portions of the present invention may be implemented in computer programs, i.e. algorithms, executing on programmable computers each comprising a data processor, a data storage system, including both volatile and non-volatile memory and/or data storage devices, at least one input device, and at least one output device. Program code is applied to input data to perform the functions described herein and generate output information. The output information is applied to one or more output devices, in known fashion. Each such program may be implemented in a high level procedural or object oriented programming language to communicate with a computer system. However, the programs can be implemented in assembly or machine language, if desired. In any case, the language may be a compiled or interpreted language. Portions of the inventive structure and method may also be considered to be implemented as a computer-readable storage medium, configured with a computer program, where the storage medium so configured causes a data processor to operate in a specific and predefined manner to perform the functions described herein. An example of one such type of data processor is a digital signal processor (DSP).

What is claimed is:

1. A method of carrier frequency acquisition for a WCDMA communication signal, the method comprising the steps of:

receiving a WCDMA communication signal;

generating a first set of correlation values associated with a first segment of a primary synchronization channel symbol for the received WCDMA communication signal;

generating a second set of correlation values associated with a second segment of the primary synchronization channel symbol for the received WCDMA communication signal;

determining a carrier frequency offset from the first and second sets of correlation values; and removing the carrier frequency offset to acquire a carrier frequency associated with the received WCDMA communication signal.

2. The method according to claim 1 wherein the step of removing the carrier frequency offset comprises adjusting a local voltage controlled oscillator to remove the carrier frequency offset in a receiver that receives the WCDMA communication signal.

3. The method according to claim 1 wherein the step of removing the carrier frequency offset comprises multiplying the received WCDMA communication signal by complex frequency correction factors to remove the carrier frequency offset in a receiver that receives the WCDMA communication signal.

4. The method according to claim 1 wherein the step of determining a carrier frequency offset from the first and second sets of correlation values comprises estimating a maximum path position p associated with the WCDMA carrier signal defined by the relationship:

$$p = \arg\max_k \left( \left| \sum_{m=1}^{L} s_{1,k,m}^* s_{2,k,m} + s_{2,k,m}^* s_{3,k,m} + \ldots + s_{y-1,k,m}^* s_{y,k,m} \right|^2 \right);$$

wherein correlation values associated with each channel segment at position k and time slot m are represented by $S_{1,k,m}$, $S_{2,k,m}$, $S_{3,k,m}$, and $S_{4,k,m}$, and wherein L is the number of time slots and y is the number of segments.

5. The method according to claim 4 wherein the step of determining a carrier frequency offset from the first and second correlation values further comprises the step of determining a phase difference associated with the largest correlation value for a respective position within a set of primary channel positions for a single WCDMA communication signal frame.

6. The method according to claim 5 wherein the step of determining a phase difference is defined by the relationship:

$$\Delta\hat{\phi} = \text{angle}\left( \sum_{m=1}^{L} s_{1,k,m}^* s_{2,k,m} + s_{2,k,m}^* s_{3,k,m} + \ldots + s_{y-1,k,m}^* s_{y,k,m} \right);$$

wherein $\Delta\hat{\phi}$ is a phase difference estimate determined from a plurality of primary synchronization channels at position k in one frame, and further wherein a correlation value associated with each segment within a plurality of defined primary synchronization channel segments at position k and time slot m is represented by $S_{1,k,m}$, $S_{2,k,m}$, $S_{3,k,m}$, and $S_{y,k,m}$.

7. The method according to claim 6 wherein the step of determining a carrier frequency offset from the first and second sets of correlation values is implemented in association with the relationship defined by:

$$\Delta\hat{f} = \Delta\hat{\phi}\frac{1}{2\pi T};$$

wherein $\Delta\hat{\phi}$ is an estimate of the phase difference between each respective segment within a plurality of defined primary synchronization channel segments and T is the length of a single segment.

8. The method according to claim 1 further comprising the step of generating a joint position and frequency estimation metric associated with the first and second sets of correlation values.

9. The method according to claim 8 wherein the step of generating a joint position and frequency estimation metric comprises estimating a maximum path position p associated with the WCDMA carrier signal defined by the relationship:

$$p = \arg\max_k \left( \left| \sum_{m=1}^{L} s_{1,k,m}^* s_{2,k,m} + s_{2,k,m}^* s_{3,k,m} + \ldots + s_{y-1,k,m}^* s_{y,k,m} \right|^2 \right);$$

wherein correlation values associated with each channel segment at position k and time slot m are represented by $S_{1,k,m}$, $S_{2,k,m}$, $S_{3,k,m}$, and $S_{y,k,m}$, and wherein L is the number of time slots and y is the number of segments.

10. The method according to claim 9 wherein the step of generating a joint position and frequency estimation metric further comprises determining a phase difference defined by the relationship:

$$\Delta\hat{\phi} = \text{angle}\left( \sum_{m=1}^{L} s_{1,k,m}^* s_{2,k,m} + s_{2,k,m}^* s_{3,k,m} + \ldots + s_{y-1,k,m}^* s_{y,k,m} \right);$$

wherein $\Delta\hat{\phi}$ is a phase difference estimate determined from a plurality of primary synchronization channels at position k in one frame, and further wherein a correlation value associated with each segment within a plurality of defined primary synchronization channel segments at position k and time slot m is represented by $S_{1,k,m}$, $S_{2,k,m}$, $S_{3,k,m}$, and $S_{y,k,m}$.

11. A WCDMA communication system comprising:

at least one receiver configured to receive an IF WCDMA signal transmitted from a WCDMA transmitter, the at least one receiver comprising:

a data processor;

a data input device in communication with the data processor;

an algorithmic software directing the data processor; and a data storage unit, wherein discrete WCDMA radio frame data, discrete WCDMA time slot data, discrete WCDMA primary synchronization channel data and discrete WCDMA secondary synchronization channel data is stored and supplied to the data processor such that the data processor, directed by the algorithmic software, can automatically generate a first set of correlation values associated with a first segment of a primary synchronization channel symbol and a second set of correlation values associated with a second segment of the primary synchronization channel symbol and therefrom determine a WCDMA carrier signal frequency offset and thereby acquire WCDMA carrier signal parameters associated with the WCDMA transmitter using algorithmically defined relationships associated with the discrete WCDMA radio frame data, discrete WCDMA time slot data, discrete WCDMA primary synchronization channel data and discrete WCDMA secondary synchronization channel data.

12. The WCDMA communication system according to claim 11 wherein the algorithmic software is configured to estimate a maximum path position p associated with the WCDMA carrier signal according to the following relationship:

$$p = \arg\max_k \left( \left| \sum_{m=1}^{L} s^*_{1,k,m} s_{2,k,m} + s^*_{2,k,m} s_{3,k,m} + \ldots + s^*_{y-1,k,m} s_{y,k,m} \right|^2 \right);$$

wherein correlation values associated with segments of a primary synchronization channel for the WCDMA communication signal at position k and time slot m are represented by $S_{1,k,m}$, $S_{2,k,m}$, $S_{3,k,m}$, and $S_{y,k,m}$, and wherein L is the number of time slots and y is the number of segments.

13. The WCDMA communication system according to claim 12 wherein the algorithmic software is further configured to estimate a phase difference associated with the WCDMA carrier signal according to the following relationship:

$$\Delta\hat{\phi} = \text{angle}\left( \sum_{m=1}^{L} s^*_{1,k,m} s_{2,k,m} + s^*_{2,k,m} s_{3,k,m} + \ldots + s^*_{y-1,k,m} s_{y,k,m} \right);$$

wherein $\Delta\hat{\phi}$ is a phase difference estimate determined from a plurality of primary synchronization channels at position k in one frame, and further wherein correlation values associated with each segment within a plurality of defined primary synchronization channel segments associated with the WCDMA communication signal at position k and time slot m are represented by $S_{1,k,m}$, $S_{2,k,m}$, $S_{3,k,m}$, and $S_{y,k,m}$.

14. The WCDMA communication system according to claim 13 wherein the algorithmic software is further configured to estimate a carrier frequency offset associated with the WCDMA carrier signal according to the following relationship:

$$\Delta\hat{f} = \Delta\hat{\phi}\frac{1}{2\pi T};$$

wherein $\Delta\hat{\phi}$ is the phase difference between each segment within a plurality of defined primary synchronization channel segments associated with the WCDMA communication signal and T is the length of a single segment.

15. A method of carrier frequency acquisition for a WCDMA communication signal, the method comprising the steps of:

(a) receiving the WCDMA communication signal;

(b) estimating the location of a primary synchronization code associated with the received WCDMA communication signal;

(c) estimating a carrier frequency offset associated with the received WCDMA communication signal containing a primary synchronization code location estimated in step (b);

(d) decoding a secondary synchronization code associated with the received WCDMA communication signal, thereby determining a code group comprising a set of scrambling codes, the secondary synchronization code overlapping a primary synchronization channel containing a primary synchronization code location estimated in step (b) and having a carrier frequency offset estimated in step (c);

(e) correlating the set of scrambling codes with distinct pilot symbols contained within the received WCDMA communication signal to determine a scrambling code being used by a transmitter generating the WCDMA communication signal;

(f) repeating steps (b) through (e) until the decoded secondary synchronization code correlates with the distinct pilot symbols contained within the received WCDMA communication signal; and (g) acquiring a WCDMA communication signal carrier frequency associated with the transmitter generating the WCDMA communication signal if and when a scrambling code is in fact being used by the transmitter generating the WCDMA communication signal as evidenced by correlation between a single scrambling code and the distinct pilot symbols contained within the received WCDMA communication signal.

16. The method according to claim 15 wherein step (f) comprises adjusting a voltage controlled oscillator (VCO) to remove the estimated carrier frequency offset.

17. The method according to claim 15 wherein step (f) comprises multiplying the received WCDMA communication signal by complex frequency correction factors.

18. The method according to claim 15 wherein the step (b) of estimating the location of a primary synchronization code associated with the received WCDMA communication signal comprises partitioning a primary synchronization channel into a predetermined number of segments, defining a correlation value associated with each primary synchronization channel segment and determining a path position p that is defined by the relationship:

$$p = \arg\max_k \left( \left| \sum_{m=1}^{L} s^*_{1,k,m} s_{2,k,m} + s^*_{2,k,m} s_{3,k,m} + \ldots + s^*_{y-1,k,m} s_{y,k,m} \right|^2 \right);$$

wherein the correlation values associated with each of the segments at position k and time slot m are represented by $S_{1,k,m}$, $S_{2,k,m}$, $S_{3,k,m}$, and $S_{y,k,m}$, and wherein L is the number of time slots and y is the number of segments.

19. The method according to claim 18 wherein the step (c) of estimating a carrier frequency offset associated with the received WCDMA communication signal comprises determining a phase difference associated with the largest correlation value for a respective position within a set of primary channel positions for a single WCDMA communication signal frame, wherein the phase difference is defined by the relationship:

$$\Delta\hat{\phi} = \text{angle}\left( \sum_{m=1}^{L} s^*_{1,k,m} s_{2,k,m} + s^*_{2,k,m} s_{3,k,m} + \ldots + s^*_{y-1,k,m} s_{y,k,m} \right);$$

wherein $\Delta\hat{\phi}$ is a phase difference estimate determined from a plurality of primary synchronization channels at position k in one frame, and further wherein a correlation value associated with each segment within a plurality of defined primary synchronization channel segments at position k and time slot m is represented by $S_{1,k,m}$, $S_{2,k,m}$, $S_{3,k,m}$, and $S_{y,k,m}$.

20. The method according to claim 19 wherein the step (c) of estimating a carrier frequency offset associated with the received WCDMA communication signal further comprises estimating a carrier frequency offset defined by the relationship:

$$\Delta \hat{f} = \Delta \hat{\phi} \frac{1}{2\pi T};$$

wherein $\Delta \hat{\phi}$ is an estimate of the phase difference between each segment within the plurality of defined primary synchronization channel segments.

21. The method according to claim 15 further comprising the step of initiating a steady state communication mode associated with a receiver that acquires the WCDMA communication signal carrier frequency associated with the transmitter generating the WCDMA communication signal.

22. A method of carrier frequency acquisition for a WCDMA communication signal, the method comprising the steps of:
 receiving a WCDMA communication signal;
 generating a first set of correlation values associated with a first segment of a primary synchronization channel symbol for the received WCDMA communication signal;
 generating a second set of correlation values associated with a second segment of the primary synchronization channel symbol for the received WCDMA communication signal; and
 locating a primary synchronization code position contained within the received WCDMA communication signal via the first and second sets of correlation values.

23. The method according to claim 22 further comprising the step of determining a carrier frequency offset from the first and second sets of correlation values.

24. The method according to claim 23 wherein the step of determining a carrier frequency offset is implemented according to the following relationship:

$$\Delta \hat{f} = \Delta \hat{\phi} \frac{1}{2\pi T};$$

wherein $\Delta \hat{\phi}$ is an estimate of the phase difference between each segment within a plurality of defined primary synchronization channel segments associated with the WCDMA communication signal and T is the length of a single segment.

25. The method according to claim 23 further comprising the step of removing the carrier frequency offset to render a receiver capable of acquiring a carrier frequency associated with the received WCDMA communication signal.

26. The method according to claim 22 wherein the step of locating a primary synchronization code position p associated with the received WCDMA communication signal from the first and second sets of correlation values is implemented according to the following relationship:

$$p = \arg \max_k \left( \left| \sum_{m=1}^{L} s_{1,k,m}^* s_{2,k,m} + s_{2,k,m}^* s_{3,k,m} + \ldots + s_{y-1,k,m}^* s_{y,k,m} \right|^2 \right);$$

wherein correlation values associated with each of the segments at position k and time slot m are represented by $S_{1,k,m}$, $S_{2,k,m}$, $S_{3,k,m}$, and $S_{y,k,m}$, wherein L is the number of time slots and y is the number of segments.

27. The method according to claim 26 further comprising the step of determining a phase difference associated with the largest correlation value for a respective position within a set of primary channel positions for a single WCDMA communication signal frame, wherein the phase difference is defined by the relationship:

$$\Delta \hat{\phi} = \text{angle} \left( \sum_{m=1}^{L} s_{1,k,m}^* s_{2,k,m} + s_{2,k,m}^* s_{3,k,m} + \ldots + s_{y-1,k,m}^* s_{y,k,m} \right);$$

wherein $\Delta \hat{\phi}$ is a phase difference estimate determined from a plurality of primary synchronization channels at position k in one frame, and further wherein a correlation value associated with each segment within a plurality of defined primary synchronization channel segments at position k and time slot m is represented by $S_{1,k,m}$, $S_{2,k,m}$, $S_{3,k,m}$, and $S_{y,k,m}$.

28. The method according to claim 22 further comprising the step of generating a joint position and frequency estimation metric associated with the first and second sets of correlation values.

29. The method according to claim 28 wherein the step of generating a joint position and frequency estimation metric comprises estimating a maximum path position p associated with the WCDMA carrier signal defined by the relationship:

$$p = \arg \max_k \left( \left| \sum_{m=1}^{L} s_{1,k,m}^* s_{2,k,m} + s_{2,k,m}^* s_{3,k,m} + \ldots + s_{y-1,k,m}^* s_{y,k,m} \right|^2 \right);$$

wherein correlation values associated with each channel segment at position k and time slot m are represented by $S_{1,k,m}$, $S_{2,k,m}$, $S_{3,k,m}$, and $S_{y,k,m}$, and wherein L is the number of time slots and y is the number of segments.

30. The method according to claim 29 wherein the step of generating a joint position and frequency estimation metric further comprises determining a phase difference defined by the relationship:

$$\Delta \hat{\phi} = \text{angle} \left( \sum_{m=1}^{L} s_{1,k,m}^* s_{2,k,m} + s_{2,k,m}^* s_{3,k,m} + \ldots + s_{y-1,k,m}^* s_{y,k,m} \right);$$

wherein $\Delta \hat{\phi}$ is a phase difference estimate determined from a plurality of primary synchronization channels at position k in one frame, and further wherein a correlation value associated with each segment within a plurality of defined primary synchronization channel segments at position k and time slot m is represented by $S_{1,k,m}$, $S_{2,k,m}$, $S_{3,k,m}$, and $S_{y,k,m}$.

31. The method according to claim 22 further comprising the step of acquiring a carrier frequency associated with the WCDMA communication signal.

* * * * *